D. C. HUGHES.
TYPE SETTING MACHINE.
APPLICATION FILED JUNE 27, 1910.

1,153,390.

Patented Sept. 14, 1915.
5 SHEETS—SHEET 1.

Witnesses:
Robert McCreadie
Jno. H. Nelson Jr.

Inventor:
Davydd C. Hughes
By 
Atty.

D. C. HUGHES.
TYPE SETTING MACHINE.
APPLICATION FILED JUNE 27, 1910.
1,153,390.
Patented Sept. 14, 1915.
5 SHEETS—SHEET 2.
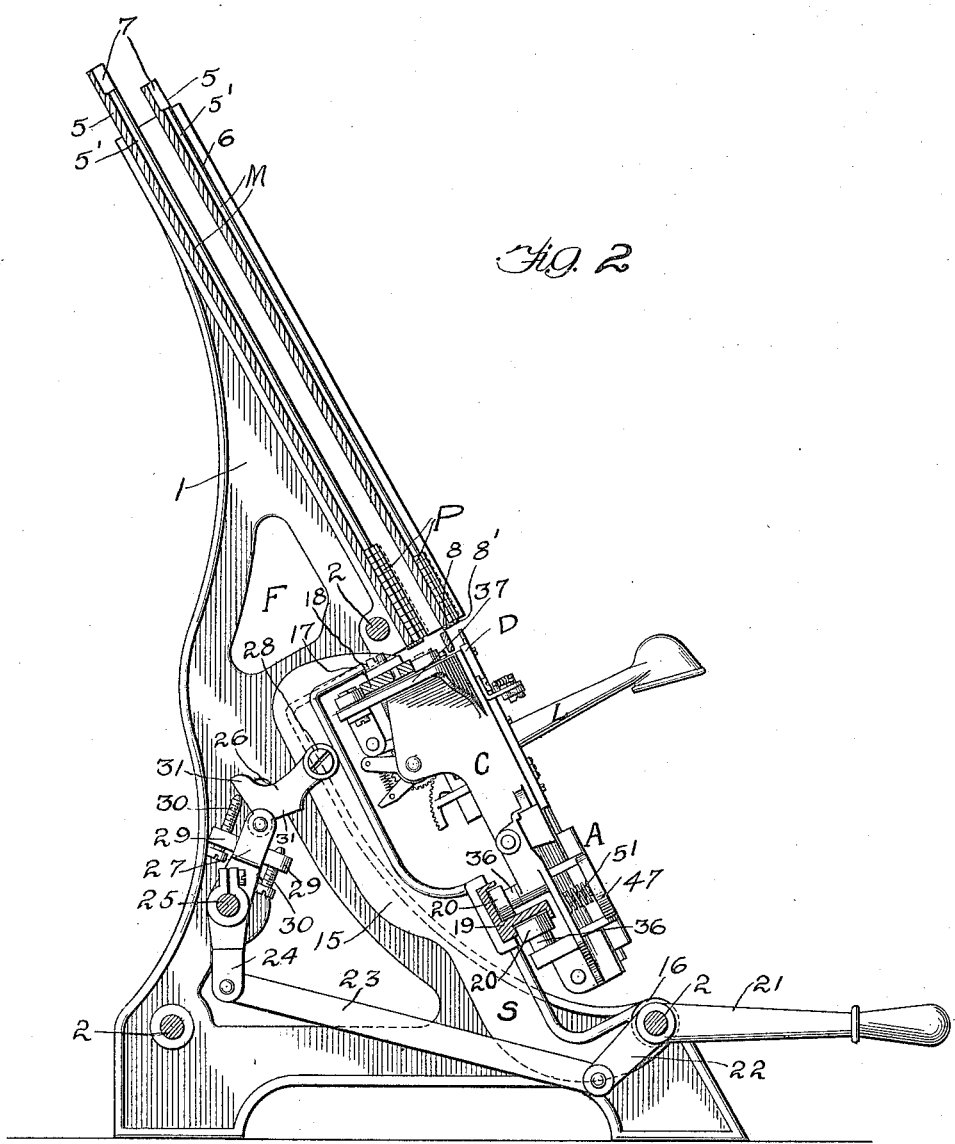
Fig. 2
Witnesses:
Robert McCreadie
Jno. H. Nelson Jr.
Inventor:
Davydd C. Hughes
By 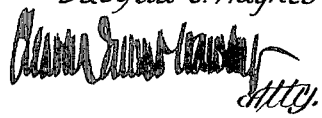
Atty.

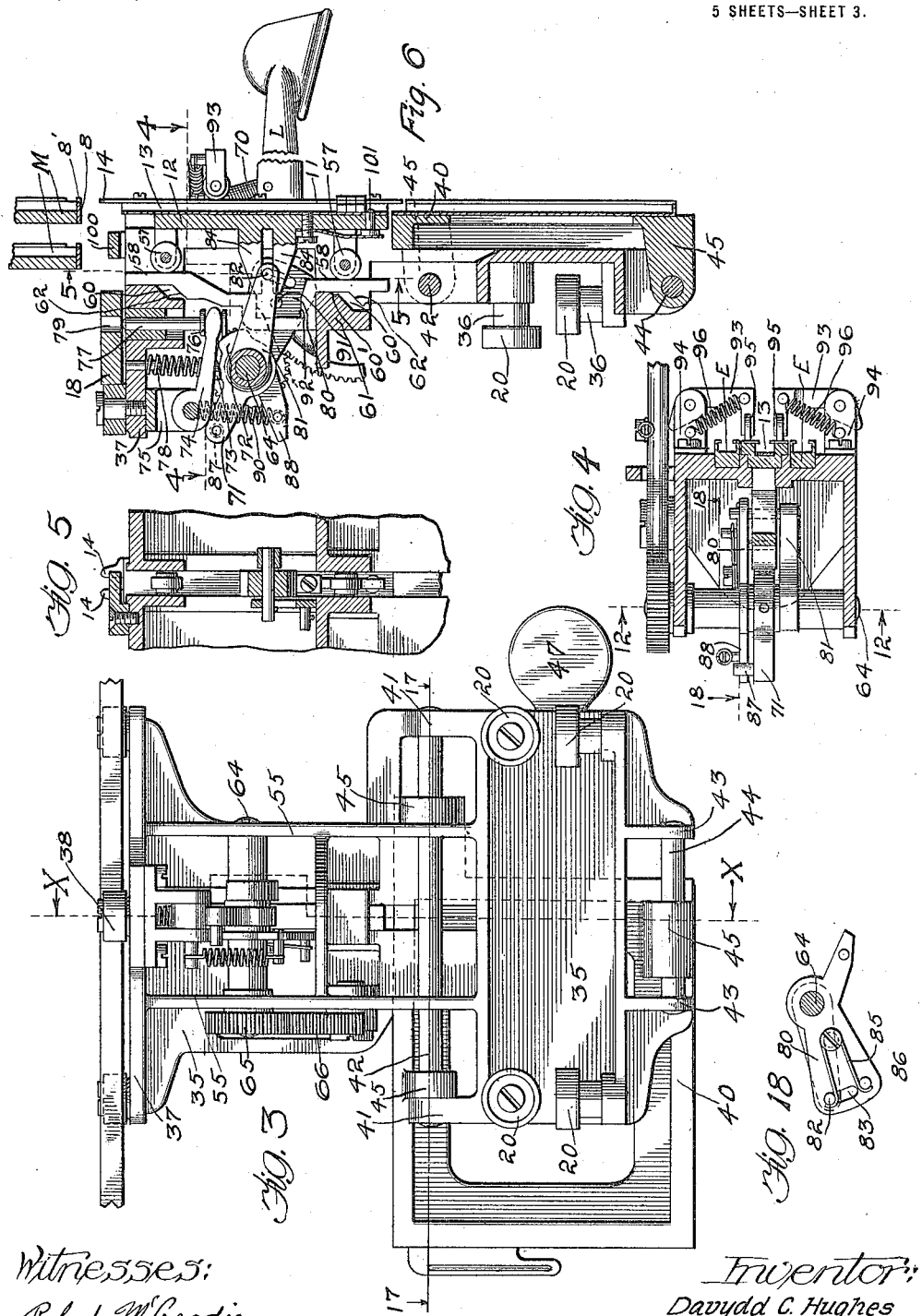

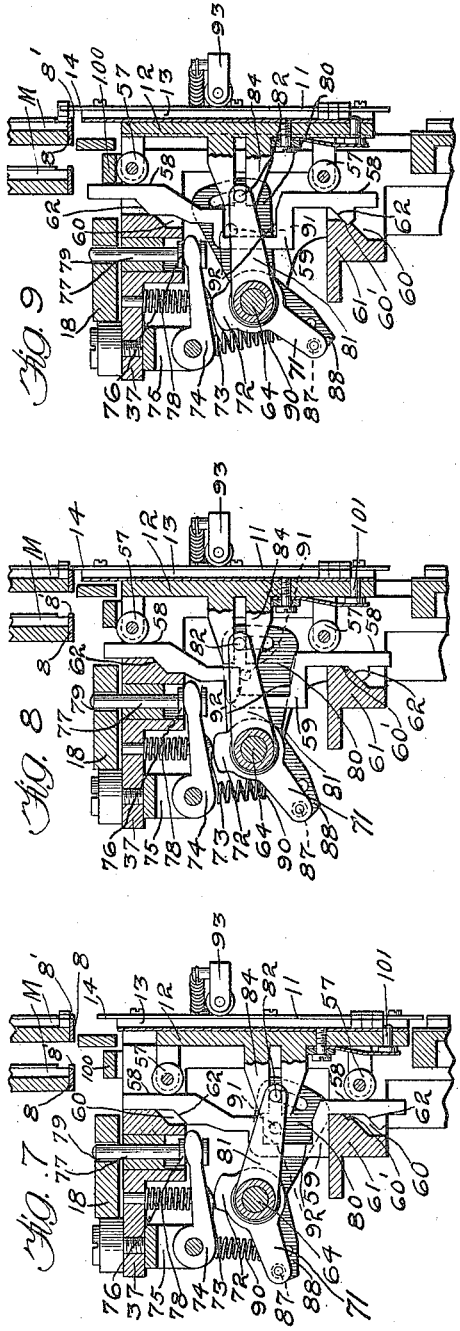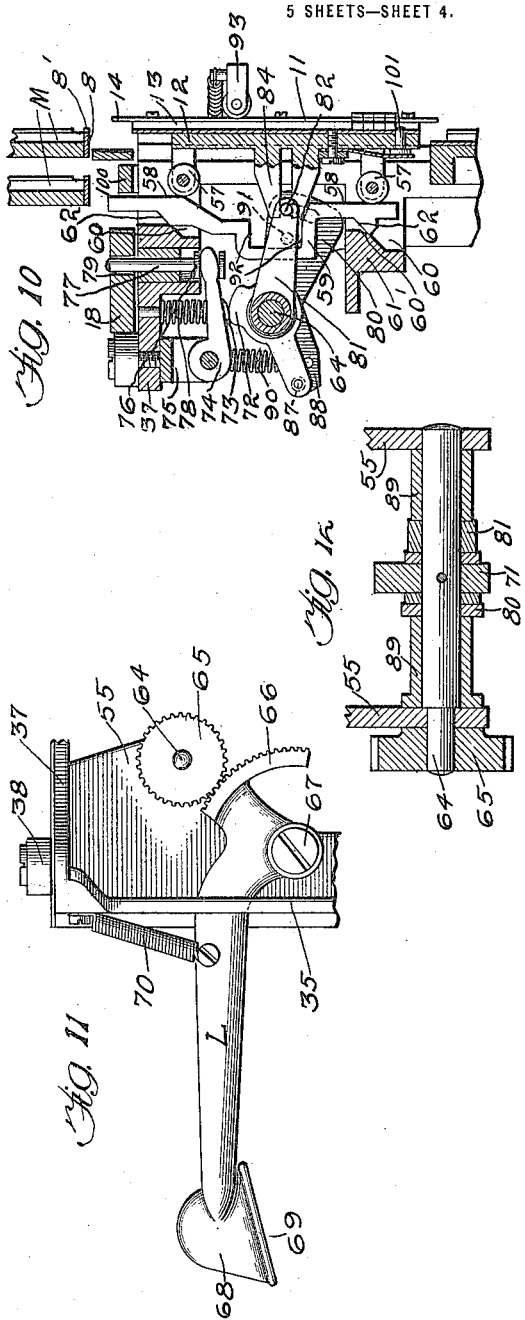

D. C. HUGHES.
TYPE SETTING MACHINE.
APPLICATION FILED JUNE 27, 1910.
1,153,390.
Patented Sept. 14, 1915.
5 SHEETS—SHEET 5.
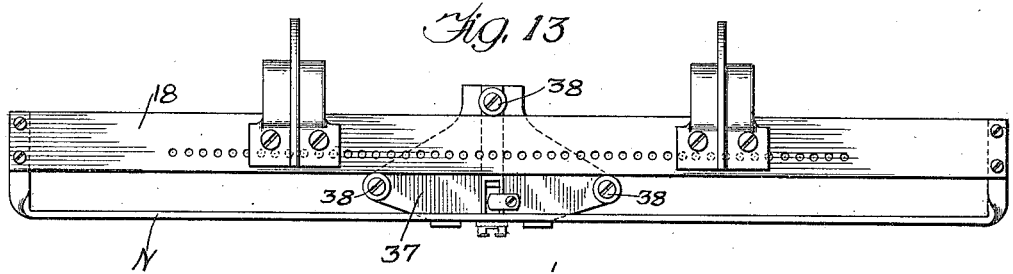
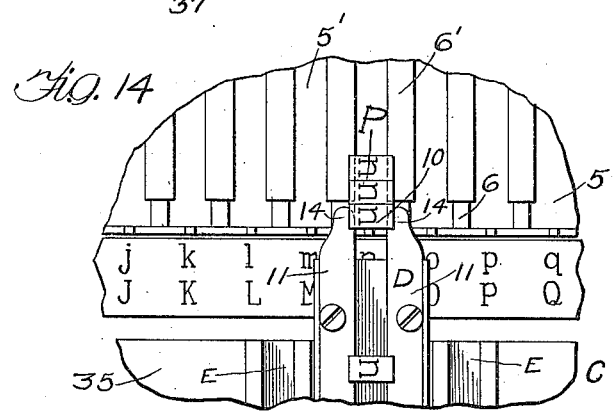
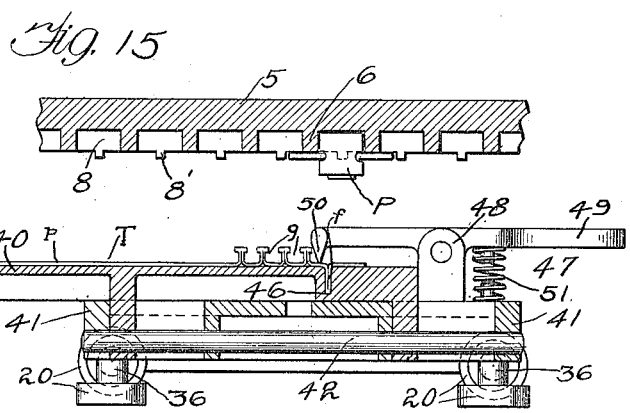
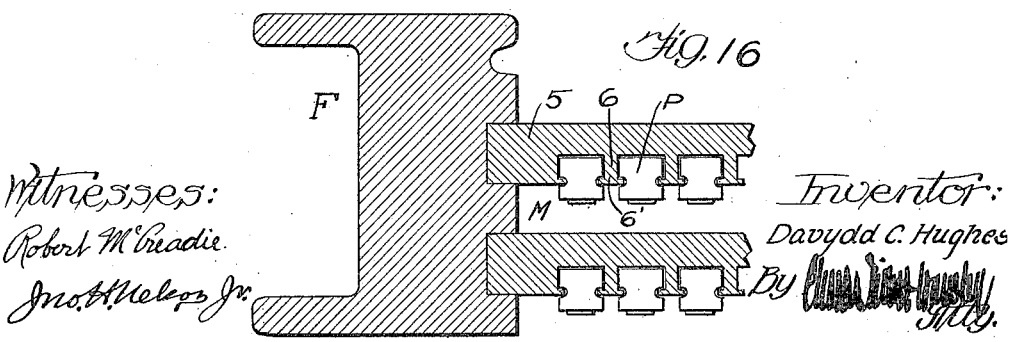
Witnesses:
Robert McCreadie
Jno. H. Nelson Jr.
Inventor:
Davydd C. Hughes
By
Atty.

UNITED STATES PATENT OFFICE.

DAVYDD C. HUGHES, OF CHICAGO, ILLINOIS, ASSIGNOR, BY MESNE ASSIGNMENTS, TO ADDRESSOGRAPH COMPANY, OF CHICAGO, ILLINOIS, A CORPORATION OF ILLINOIS.

TYPE-SETTING MACHINE.

1,153,390. Specification of Letters Patent. Patented Sept. 14, 1915.

Application filed June 27, 1910. Serial No. 569,209.

*To all whom it may concern:*

Be it known that I, DAVYDD C. HUGHES, a citizen of the United States, and resident of Chicago, Cook county, Illinois, have invented certain new and useful Improvements in Type-Setting Machines, of which the following is a full, true, clear, and exact description, such as will enable others skilled in the art to which it appertains to make and use the same.

My invention pertains to improvements in type-setting or type-composing machines and has particular reference to machines for setting up or composing metallic type such as used in addressing, printing, canceling machines and the like.

The object of my invention is to provide a type-setting machine of the class above mentioned in which may be placed a supply of type in a distributed or sorted condition and which will operate to collect individual type from this supply and assemble or group them in composition.

The more particular object of my invention is to provide a type-setting or type-composing machine which may be used in an office as an adjunct to printing or addressing systems and the like for setting up names, addresses or other printing matter in the portable type holders or type plates such as used in office printing or addressing machines; which will be simple and durable in construction and will require no particular skill on the part of the person operating it, and which will be so constructed and arranged that should errors be made in assembling or grouping the type they may be easily rectified.

My invention has as its further object the provision of a type-setter which will be especially adapted for composing or assembling the grooved, metallic "typewriter" type used in the "Rogers' addresser" system.

Figure 1:
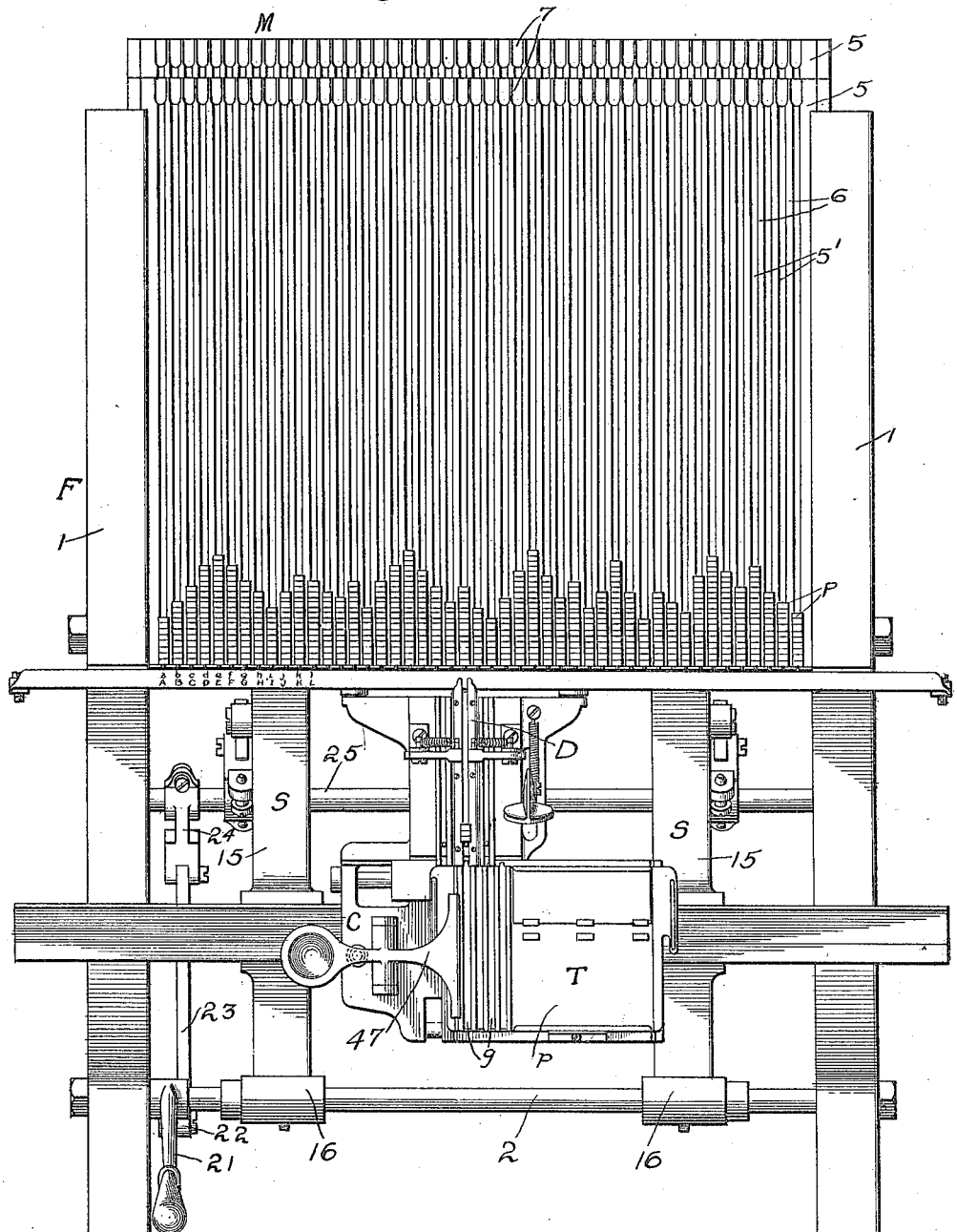
Figure 1:

I will describe one embodiment of my invention by reference to the accompanying drawings in which:

Figure 1 represents a front elevation of a type-setting machine embodying my invention, this view showing the magazines containing supplies of sorted or distributed type, and the composing device or type extractor for assembling said type in composition; Fig. 2 is an end view of the machine shown in Fig. 1, one of the side members of the supporting frame being removed to expose to view the various parts in their relative operating positions; Fig. 3 is an enlarged rear view of the main and auxiliary carriages together with the mechanism carried thereby for operating the composing device; Fig. 4 is a sectional view on line 4—4 of Fig. 6; Fig. 5 is a sectional view on line 5—5 of Fig. 6; Figs. 6, 7, 8, 9 and 10 are detail sectional views taken on line x—x of Fig. 3 showing the position of the various parts during each step in the operation of the composing device; Fig. 11 is an enlarged detail view of the lever for operating the composing device; Fig. 12 is a sectional view on line 12—12 of Fig. 4; Fig. 13 is an enlarged top plan view of the plate or member for locking the carriage and its composing device in proper operative positions relative to the magazines. Figs. 14 and 15 are enlarged detail views showing the formation of the metallic type and the terminal ends of the magazine channels, and also showing the composing device or type remover in the act of seizing a type in one of the magazine channels; Fig. 16 is an enlarged fragmentary, transverse sectional view of a portion of the frame and the two magazines for "upper" and "lower" case type, and also showing clearly the manner in which the distributed type are retained in their channels; Fig. 17 is a sectional view on line 17—17 of Fig. 3; and Fig. 18 is a detail view of an operating part taken on line 18—18 of Fig. 4.

It will be obvious from the following description that the principles and functions of my invention may be embodied in any structure best adaptable to the requirements of the work which they are to perform. The structure shown in the drawings is a type-setting machine which is peculiarly adapted to the work of setting up printing matter in portable, unit type holders or type carriers of the kind employed in the "Rogers Addresser" system, and I will accordingly describe my invention as exemplified in this structure:

*The framework.*—All of the parts or operating mechanisms which make up the complete structure are supported in a framework F to maintain them in definite relation so they will properly perform their functions. This framework comprises two side members 1 preferably of cast metal and of suitable form, held rigidly in position and spaced apart in vertical parallel relation by the three cross bars or brace rods 2. This arrangement forms a substantial foundation for the various operating parts. In the upper portion of the framework the magazines M containing the supplies of distributed type are supported, and in the lower portion thereof are mounted the main and auxiliary carriages C and A respectively and their supporting frames for the carriage, the side members of the framework being cut away at their lower portions to provide room for the carriages to shift to their various positions. It will be noted that the magazines M, the composing device and the type holder T are all disposed in said framework in substantial alinement in the same general plane, and that this plane is inclined or angularly disposed with relation to the table or desk upon which the machine is placed. The purpose of this arrangement is two-fold: the magazines and the operating parts are sufficiently vertical so that the movement or travel of the type through the whole machine is brought about by the action of gravity, and the general plane or face of the machine is in proper position with the line of vision of a person operating the machine, as he sits at a desk or table. The whole framework and parts are all arranged in a compact, rigid structure admirably adapted to the requirements for a type-setting machine of this class.

*The magazine.*—The present structure is particularly designed for handling and composing the so-called "typewriter" type such as is used in the "Rogers" system. These type are formed of cast metal, grooves being provided in the side faces thereof which coöperate with flanged slots in the unit type-holders to retain the type in place in the type-holders. These individual type P are preferably arranged in rows or segregated groups, in a distributed or sorted condition, each row or group having type representing similar printing characters. These groups of distributed type are contained in supply-magazines which present them in proper position so that the individual type may be selected and withdrawn therefrom by the composing device to set up an assembled group of type representing a name, address or other printing matter. I have preferred to arrange this supply of distributed type in two magazines, one for "upper" case and the other for "lower" case type. The terms "upper" case and "lower" case, however, are used as a matter of convenience and are to be construed to indicate different classes of type rather than to merely indicate small and capital letters, as is generally understood by these terms. The magazines are disposed in the upper portion of the framework, the magazine for "upper" case type being preferably disposed behind the magazine for "lower" case type, and preferably to contain a supply of type which is not used as frequently as the type contained in the front magazine. The magazines are preferably identical in construction except that the rear magazine is slightly higher than the front magazine for convenience in placing the distributed type therein. Each magazine comprises a flat, rectangular, metal plate 5 having a plurality of parallel type channels or slots 5' provided in their front faces and formed between a plurality of parallel ribs 6. Each rib is provided with laterally projecting flanges 6' which restrict or reduce the mouths of the channels and which engage the grooves in the side faces of the type to prevent the type from becoming displaced. The channels are filled with type from their upper ends and have portions 7 at these ends to permit of easy insertion of the type. The type slide freely in their channels and the magazines are arranged in a sufficiently vertical position to cause the type to be fed downwardly by gravity, thereby continually presenting the individual type at the lower ends of the channels for removal therefrom as long as the supply in each channel lasts. The lower ends of the type channels 5' terminate on a common line, this line being preferably formed by the lower edge of the magazine plate (Figs. 14 and 15) and the type are prevented from dropping out of their channels by an abutment strip 8 and the small abutment lugs or projections 8' carried thereby disposed along the terminal ends of the channels. These lugs are considerably narrower than the channels so that they will not interfere with the operation of the composing device, as will be hereinafter described. As will be seen in Figs. 13 and 14 the terminal ends of the channels 5' are formed in such a manner that they permit the lowermost or end type contained therein to be extracted or withdrawn therefrom by the composing device. The flanges 6' are cut away for a portion of their length so as to leave the mouth or entrance of the channels unrestricted, thereby forming outlets for the channels at the terminal ends thereof, these outlets being disposed alnog the common line formed by the lower edge of the magazine plates. These outlets leave the lowermost or end type free in each channel to be removed or extracted therefrom preferably in a direction perpendicular to the longitudinal axis of the rows of type.

I have preferred to mount both of the magazines in the upper portion of the frame in such manner that they may be conveniently removed therefrom. This is particularly desirable for two reasons: It enables access to be gained to the rear magazine should any of the type lodge or stick in the channels therein, and it permits of the use of two sets of magazines, one of which may be in the process of filling or charging while the other is in use in the machine, thereby eliminating the waste of time incident to the use of only one set of magazines. The construction which permits of the removal of the magazines from the frame is clearly apparent in Fig. 16 in which the vertical or side edges of the magazine plates 5 are slidably mounted in grooves on the inner faces of the side members 1 of the main frame.

*The composing device.*—The composing device or type extractor of the present structure is a mechanism which is shifted or moved along a path parallel to and below the line of channel outlets but in substantially the same plane as the magazines in order to position it coincident with and in alinement with any of the channels in the magazine, and when in the alined position it is made to advance or approach toward the end type 10 in the channel and seize the end type presented at the outlet thereof and then to retreat with its captured type to normal position. The captured type fall by gravity preferably into a temporary receptacle or channel where they are tentatively retained until a composed group thereof is collected together. This group may then be discharged or transferred into the printing machine type holder which is detachably positioned to receive said type from the composing device.

The composing device D preferably comprises two flat strips or plates 11 mounted upon a traveling block 12 on each side of a type groove 13 contained therein. Together with the groove in the block 12 they form a type channel similar to the channels of the magazine. This channel constitutes a sort of temporary receptacle through which the type pass or are retained temporarily while being assembled or composed. The strips are substantially as thick as the flanges on the ribs of the magazine channels and engage the grooves in the side faces of the type to hold the type in position in the channels. The upper ends 14 are narrow so they are substantially as wide as the ribs 6 are thick. The strips 11 with their ends 14 lie in substantially the same plane as the plane of the flanges 6' of the magazine slots, and when they are advanced toward the outlets at the ends of the magazine channel they overlap the ends of the ribs 6 and form in a sense a continuation of the flanges 6'. The ends 14 enter the grooves in the side faces of the type presented at the outlet with which the composing device is alined and in this manner seize hold of said type when the composing device is operated for the purpose of extracting the individual type.

The composing device D is given a peculiar movement relatively to the row of type in the magazine channel with which it is operatively related and during this movement it performs its function of extracting type from the supplies of distributed type in the magazines. The path of this movement is preferably rectangular in form. On two sides of this rectangle the movement of the composing device is substantially parallel to the longitudinal axis of the rows of type in the magazine channels and the movement thereof on the other sides of this rectangle is perpendicular to this axis. The first step of its movement in its rectangular path is a longitudinal approach or advance in a direction toward the terminal ends of the channel. During this step the end type which is seated at the channel outlet for removal therefrom is seized as the ends 14 of the composing device enter the grooves in the side of the type. The second step in its movement is perpendicular to the axis of the channel and is in a direction to lift out or extract its captured type from the channel outlet. The third and fourth steps in its movement are retreative movements parallel to but in the directions opposite to its first and second steps respectively, the fourth step, that is, the step in which it returns to normal position, being brought about very quickly in order to agitate the type to insure its dropping into the temporary receptacle.

The mechanism by which movement is imparted to the composing device will be described later.

*The support for the carriages.*—Between the side members 1 of the framework and below the magazine is mounted the mechanism for carrying out the various operations of the composing device in the performance of its function of selecting and removing the individual type from the magazines. The composing device and its operating mechanism are mounted upon a carriage C which is movable or shiftable in substantially the plane of either magazine and parallel with the line of terminal outlets of the magazine channels. The carriage is mounted upon a swinging framework or support S by which it may be swung into operative relation to the type in either of the magazines in the upper portion of the framework. This supporting framework S comprises two side members 15 pivoted at their lower ends 16 upon the lower forward cross-bar 2 of the main framework and extending parallel in a general upward direction so that their upper portions lie considerably to the rear of the planes of the magazines. The upper ends 17 of the side members are turned forward at right angles and carry the locking plate or bar 18 by means of which the carriage C is locked in position relatively to one of the channels of the magazine as will be hereinafter described.

This locking plate 18 is bolted to the ends of the side members to rigidly maintain them in their proper relation and in addition serves as a guide rail for the upper end of the movable carriage upon which the composing device is mounted. The side members 15 support at substantially their middle portions a guide rail or track 19 upon which the carriage C travels to its various positions. This guide rail is a bar substantially L-shape in cross section and having two longitudinal grooves or runways for the rollers 20 of the carriage C, these runways being disposed at right angles to each other to prevent the rollers 20 from becoming displaced, thereby holding the carriage C in proper engagement with its guide rail. Both the upper guide rail 18 and lower guide rail 19 are disposed parallel to the common line along which lie the outlets of the magazine channels in order to guide the lateral movement of the carriage and its composing device in a path parallel to said outlets. The ends of both of these rails project laterally beyond the side members 1 of the main frame to permit the composing device to shift a sufficient distance to reach the outermost groups of distributed type in the magazines. This support S is swung on its axis 2 so that its upper portion carries the main carriage, the type holder carriage and the composing device into operative relation to the front and rear magazines in a manner similar to the operation of an ordinary railroad switch. The support is swung on its axis by means of the operating lever 21 fulcrumed on the cross rod 2, the short arm 22 of this lever being connected through the medium of a link 23 with a crank arm 24 rigidly clamped on and adapted to operate a shaft 25 journaled in the rear portion of the side members 1 of the framework. Between this shaft and the upper portion of one of the side members 15 of the supporting frame is an adjustable toggle for transmitting motion to the swingable support S. This toggle comprises the two links 26 and 27 pivotally connected together at one of their ends. The other end of the link 27 is rigidly secured to the operating shaft 25 and the other end of link 26 is pivotally connected at point 28 to the side member 15 of the supporting framework S. This link 27 has lugs 29 projecting laterally therefrom on both sides, and screwing into these lugs are the adjustment bolts 30, the ends of which abut against the abutment surfaces provided by the offset portions 31 of the link 26. By turning the bolts 30 the movement of the toggle may be restricted or limited and the range of movement of the supporting framework S can be very accurately adjusted to place the composing device in exactly its proper operating position. It will thus be seen that by operating the lever 21 the carriage supporting frame can be swung on its pivot 2 to carry the composing device into operative relation to either of the magazines, and that this movement can be adjusted by the toggle lever just described.

*The carriage for the composing device* is a structure mounted upon the supporting frame S and arranged to be shifted or moved laterally thereon along the terminal ends of the magazine channels. It carries the composing device and the type-holder with it so as to position both in proper alinement with the rows of distributed type in the magazine. This carriage preferably comprises a plate 35 of cast metal suitably formed to represent generally an inverted T and provided with vertical and cross ribs on its rear face for strengthening the plate and for providing a means upon which the various operating parts are secured in proper relation. On the rear face of the cross bar portion of this inverted T at the ends thereof are provided two sets of friction reducing rollers or bearings 20 with their axes of rotation perpendicular to each other. These rollers are mounted upon the ends of short stud shafts 36 secured to the plate and are arranged with their axes of rotation perpendicular to each other so as to operate in the grooves or runways of the guide rail 19 in order to maintain the lower portion of the carriage in proper position on the guide rail and at the same time reduce the friction between said parts to a minimum. The upper end of the stem portion of the inverted T-shaped plate has an expanded, flat portion 37 which projects laterally and rearwardly therefrom. Upon this flat portion three friction rollers 38 are arranged in triangular relation to engage the edges of the locking plate and upper guide rail 18, these rollers being provided to maintain the upper portion of the carriage in position on its guide rail and at the same time to materially reduce the friction therebetween. It is to be observed that the various rollers are disposed sufficiently far apart to guide and support all parts of the carriage so that it does not wabble or become displaced out of its path of movement, and at the same time the carriage is shiftable with very little effort along its path of movement on its guide rails to any position in which it is desired to place the composing device with respect to the type in the magazine.

On the front face of the carriage plate 35 are two grooved pieces E disposed parallel to and at the side of the composing device, and set securely in slots in the face of said plate. Their lower ends extend downwardly substantially flush with the lower ends of the strips 11 of the composing device (see Figs. 1, 4 and 14). These pieces are flanged to hold type in a similar manner to the magazine channels and constitute what I term for convenience "error" slots, the function of which will be described later.

*The auxiliary or type-holder carriage.*— On the lower portion of the front face of the main carriage C is an auxiliary carriage A which is shiftable on said carriage C relatively to the composing device, and which is provided for the purpose of supporting the type holders while the type are being composed. This carriage may be constructed in any suitable form to adapt it to the particular type-holder plate which it is to support. In the present structure I have arranged this carriage in a manner suitable for supporting the portable type holders such as are used in the "Rogers" system.

These type holders are unitary devices, each adapted to contain a group of composed type representing a name and address or other subject matter. They are arranged to be filed in cabinet drawers in a similar manner to a card index, and to be stacked up in the magazine of a printing machine from which they are removed one by one, and brought into printing engagement with letter heads, envelopes and the like, to print thereon the subject matter for which their type are set up. Each type holder consists of a flat, rectangular, metallic plate $p$ provided with a number of parallel type-retaining slots or channels $g$ on its front face near one end thereof, and with guide and spacing flanges $f$ at each end of its under or rear face (Figs. 1 and 17), the flanges being for the purpose of spacing the plates in the cabinet drawer and printing machine magazine.

The auxiliary carriage A which I have provided for supporting a type-holder of this character while the type are being composed comprises a substantially rectangular, open frame or plate 40 positioned to move or shift laterally on the lower portion of the front face of the main carriage C. The cross bar or lower portion of the main carriage C has upwardly directed lugs 41 on each end thereof and between these lugs is a rod 42. The lower edge of this cross bar portion has downwardly depending lugs 43 between which is a short rod 44. The plate 40 has bearing lugs 45 projecting rearwardly from its upper and lower edges and these lugs are slidable upon the rods 42 and 44 so as to permit the auxiliary carriage to move laterally on the main carriage and carry with it the type-holder T whereby the several slots thereof may be positioned in alinement with the composing device to receive type therefrom, this range of movement being limited by the lugs 41 and 43. The auxiliary carriage plate 40 is also provided with slots 46 on its front face to accommodate the flanges $f$ of the type holder T, so that the plate lies flat upon its carriage and is held thereby against lateral movement on its carriage.

The type holder T and its carriage are held in any position to which they are adjusted by means of a thumb-lever or finger 47 pivotally mounted between two bearing lugs 48 on the face of the main carriage C adjacent the end of the auxiliary carriage. One end of this lever is provided with a thumb-piece 49 and the other end is expanded transversely to form a clamping portion 50 having a wedge-shaped edge which rests upon the top of the rows of type in the slots of the type holder. A spiral spring 51 normally maintains the clamping portion in engagement with the row of type in the type holder slot. This simple form of clamping device is very effective to hold the type holder in proper position to receive the type from the composing device, and it is only necessary to press upon the thumb-piece and raise the clamping portion against the tension of spring 51, when it is desired to remove or replace the type holder T or to shift said type holder and its carriage to aline any of the slots $g$ with the composing device. It will be noted that, although the clamping portion rests on the face of the type, the pressure thereof is distributed throughout substantially the entire row of type in the slot, hence the pressure on any one point in the row is not sufficient to cut or damage the face of the type.

*The operating mechanism for the composing device.*—Referring now more particularly to Figs. 3 to 12, inclusive, I will describe the mechanism by which the rectangular movement is imparted to the composing device. This mechanism is almost wholly mounted at the rear of the previously mentioned stem portion of the inverted T-shaped main carriage plate 35, and the side or vertical ribs 55 of this plate provide suitable journals or bearings for the various pin shafts of the operating mechanism.

As previously described, the composing device or type extractor strips 11 are mounted upon a traveling block 12. This block has a rearwardly extending lug at each end. These lugs carry small roller bearings 57 which run on the bearing surfaces 58 of a peculiarly formed floating cam member 59. These surfaces are disposed in alinement and substantially parallel to the longitudinal axes of the magazine slots, and serve to guide the block 12 during its first and third step of its rectangular path of movement. This floating cam member is slidably placed in the slots 60 formed in the cross rib 61 and the upper plate 37 of the carriage plate 35, and is provided with cam surfaces 62 which engage corresponding cam surfaces in the bottom of the slots 60. Now when the floating member 59 is moved longitudinally in its slots it rides up on the cam surfaces in the bottom thereof and carries with it the block 12. This is the manner in which the composing device receives the second and fourth steps of its rectangular movement.

Journaled in the vertical ribs 55 is the main operating shaft 54. Upon one of its ends it carries a spur gear 65 which meshes with a segmental gear 66 carried on the short arm of an operating lever L, this lever being pivotally mounted upon a stud bolt 67 secured to the outside of the vertical rib 55 (see Figs. 11 and 12). The longer arm of this operating lever projects through an opening in the main carriage plate 35 and carries on its outer end a peculiarly formed grip or handle which comprises a flat, vertical web 68 and a transversely disposed thumb-plate 69. This handle is preferably gripped by placing the web between the first and second finger and placing the thumb against the underside of the thumb-plate. The operating lever is maintained in its normal position by the spring 70 connected between itself and the upper portion of the main carriage plate 35. The shaft 64 has rigidly connected to it an arm 71 provided with a cam portion 72 which engages with the cam portion 73 carried by the arm 74 of the locking device for holding the carriage and its composing device in its proper relative position to the different groups of type in the magazine. This arm 74 is carried upon a pin shaft supported in the hangers 75 depending from the flat portion 37 of the carriage. The arm 74 has its free end formed to operate in a collar 76 carried by the lower end of a locking pin 77. The locking pin is journaled to reciprocate in a suitable bearing in the flat portion 37 of the carriage and is normally maintained in a retracted position by a spring 78 so that it rests with its upper end substantially flush with the face of the flat portion 37. When the carriage has been shifted to a position so that the composing device is alined with the desired group of type the operating lever L is depressed and the locking pin is projected upwardly into the hole 79 in the locking plate and upper guide 18 which corresponds with that group of type. The locking in position of the carriage occurs slightly in advance of the operation of the composing device as will appear hereinafter.

Rotatably mounted upon the main shaft 64 on the opposite side of the arm 71 are levers 80 and 81 which project forwardly therefrom in parallel relation and have at their free ends a lost motion or pin and slot connection with each other. It is through the medium of these two levers that the traveling block 12 and the floating cam member 59 are operated to cause the composing device to travel over its rectangular path of movement. The lever 81 carries at its free end a pin 82 which projects through and operates between the end limits of a slot 83 provided therefor in the outer end of the lever 80. This pin also operates in a slot formed by the two lugs 84 extending rearwardly from the traveling block 12 to provide an operative connection between the levers and the traveling block. The levers are maintained in such relation to each other by the spring 85 that the pin 82 is normally held in the upper end of the slot 85. The spring 85 is mounted upon the outer face of the lever 80 and one end thereof engages with the pin 82 and the other end with the pin 86 carried by the lever 80. The arm 71 carries a pin 87 at its outer end and which engages with an arm 88 of lever 80 whereby said arm 71 is swung on its axis by the operating lever L of the machine. The two arms of lever 80 are angularly disposed with respect to each other to such a degree that when the operating mechanism is in its normal position the arm 71 may travel downward a considerable distance before it engages with the arm 88 thereby permitting the locking pin to operate slightly in advance of the operation of the composing device. The levers are normally maintained in their lower positions by the spiral spring. The lever 80 also carriers a pin 91 which plays between the surfaces 92 formed by a U-shaped depression in the floating cam member 59 to move said floating member up and down in its slots 60 as the operation of the mechanism progresses.

The traveling block 12 and floating member 59 are constantly held in place in the carriage by tension members 93 upon lugs 94 outstanding from the face of the main carriage plate. These lugs carry rollers 95 at their inwardly turned ends which are constantly pressed against the strips 11 of the composing device by the springs 96 connected to the ends of the levers and to the base of the lugs 94. These members exert a yielding pressure upon the strips 11, holding the block 12 and the floating members in place while they are being operated. They also permit of easy removal of the block 12 should it become fouled with type, and their free ends are separated to allow access to be had to the temporary receptacle.

The operation of this mechanism is as follows: Assuming now that the composing device and carriage have been shifted into position to register with one of the rows of type in the magazines, the operating lever L is depressed and through the gears 66 and 65 rotates the shaft 64 to swing the arm 71 downwardly. The cam 72 on said arm is brought into engagement with the cam 73 of arm 74 of the locking device and causes the locking pin 77 to be prejected upwardly into the hole 79 of the locking plate 18. This positively secures the carriage against movement while the composing device is in operation. The arm 71 through its pin 87 now engages with the arm 88 of lever 80 and the further movement of said arm 71 swings the lever 80 in an upward direction. The traveling block 12 is thereby moved longitudinally by the lever 80 and the pin 82 through the agency of the spring 85 carried by the lever 80. The resistance offered by the traveling block is not sufficient to overcome the tension of spring 85 hence during this movement the pin 82 remains at the upper end of the slot 83 until the traveling block and the composing device assume the positions shown in Fig. 8, the upper roller 57 of the block being against the stop 100. This comprises the advance step or first step in the rectangular path of movement over which the composing device travels. As a result of this first step the composing device approaches the outlet and seizes the lowermost or end type therein, as previously described. During this first step the pin 91 on lever 80 carries the floating cam member 59 upward to bring its cam surfaces 62 into engagement with the cam surfaces in the bottom of its slots thus placing said member in position to be operated to bring about the second step in the rectangular path of movement. The pin and slot connection between levers 80 and 81 permits lever 80 to further continue its movement in order to bring about the second step of movement. This further movement of lever 80 continues until the pin 82 lies at the lower end of slot 83 and the spring 85 is placed under tension so as to return the levers to their normal relation when the operating lever is released. During this further movement the pin 91 on lever 80 causes the floating cam member to ride upward and forward in a diagonal direction on its cam surfaces, said floating member carrying with it the traveling block 12 and the composing device. The parts then assume the positions shown in Fig. 9. It is during this second step that the composing device extracts or withdraws from the group the type which it captured during its first movement.

The first two steps in the operation of the mechanism just described are brought about by the downward depression of the operating lever L, and during the return to normal position of this lever the other two steps in the operation are performed. In the end of the lower cam surface in the bottom of the slot 60 is a small notch 60' into which the end of the lower cam 62 drops when the floating member has reached the end of its movement on the cam surfaces. This holds the said floating member in position while the composing device performs the third step in its movement. The operating lever in its return to normal position allows the spring 90 to retract lever 80 and the pin 82 again becomes positioned at the upper end of the slot 83. The two levers 80 and 81 move downwardly together carrying with them the traveling block 12. This constitutes the third step of the composing device, this step being parallel to but in an opposite direction to the first step.

The moment that the traveling block reaches the lower limit of the third step, the pin 91 on lever 80 strikes the lower surface 92 of the U-shaped depression in the floating cam member 59 and pushes the lower cam 62 thereof out of the notch 60' leaving the spring tension members 93 on the front of the carriage plate to force the composing device, the traveling block and the floating cam member back into their normal positions, as shown in Fig. 6. Further movement of the operating lever L permits the arm 71 to break its engagement with lever 80 and to remove the cam 72 thereby retracting the locking pin 77. The carriage is thereby released and is in readiness to be shifted in another position.

*Modus operandi of the entire machine.*— When it is desired to set up a name, address, or, in fact, any printing matter, in a type-holder for use in a printing machine, the thumb lever 47 is raised and a type holder placed on the auxiliary or type-holder carriage A. The auxiliary carriage is then shifted laterally upon the main carriage until the desired slot in the type holder is in line with the temporary channel of the composing device. The thumb lever then upon being released will clamp the type holder and its carriage firmly in their adjusted position in readiness for the composing operation.

Let us assume that the name "John Smith" is to be set up in a slot in the type holder. Since the first letter in this name is a capital "J," and since in the present structure the capital letters are contained in the rear magazine, it is necessary to raise the shifting lever 21 of the carriage supporting frames to swing the carriage and composing device into operative relation to the rear magazine. The main carriage is then shifted laterally upon its guide rails until the composing device is in alinement with the group of type in the slots of the magazines which contain the capital letter "J," as indicated by the dial plate N which is mounted below the magazines on the upper guide rail 18. The operating lever L is then depressed and pursuant to the operation previously described the carriage is locked in position. Shortly thereafter the composing device approaches and seizes the lowermost or end type in the distributed row or group of "J's," and goes through the remaining steps of its movement to extract and retreat with its captured type until it reaches normal position. During its retreative movement the type drops or settles down by gravity against a spring pressed stop pin 101 in the lower end of the temporary channel. Since the next letter in the name "John" is small "o" the main carriage and composing device are swung into operative relation to the front magazine and the operation then proceeds as described for selecting and extracting the letter "J."

When the various individual type have been collected or composed in a group to represent the name "John Smith," the whole group of type are transferred from the temporary channel to the slot of the type holder in line therewith by means of any suitable tool which will enter the space between the strips 11 of the composing device, it merely being necessary to exert a pressure upon the upper end of the composed row of type sufficient to push the type past the spring stop. The stop pin 101 projects into the temporary receptacle just a sufficient distance to hold the type therein. When this slot in the type-holder is filled to the desired extent the plate may be shifted laterally to bring another of its slots into alinement with temporary receptacle and the operation of extracting the type from the magazines and composing them may be carried out as before.

In the event that an error is made in setting up the type it is only necessary to shift the type holder until the slot containing the error is in line with one of the "error" slots. All of the type above the wrong or incorrect letter are then transferred upwardly into the "error" slot and the type holder shifted back again into alinement with the composing device. The proper type is now selected and transferred to the type holder after which the type holder is shifted back to the "error" slot again and the type contained therein replaced in the slot of the type holder.

It is quite obvious that the structure which I have just described may be modified to great extent without departing from the spirit of my invention. Thus the type as they are extracted from the distributed groups in the magazines may fall directly through into the slots of the type holder instead of being held temporarily in the temporary receptacle. It is also obvious that the distributed type need not be contained in two magazines, as I have shown them, but instead may be distributed in one or more magazines. Furthermore, other means of presenting the individual distributed type to the composing device may be used without departing from my invention.

I claim:

1. In a type-setter a magazine having a plurality of channels for containing distributed type, a carriage shiftable into alinement with one of said channels, a receptacle positioned on said carriage for temporarily holding a line of type, means for moving said receptacle to withdraw the type from said channels and deposit them in said receptacle and a type holder associated with said receptacle and arranged to move with and relatively to the receptacle.

2. In a type-setter a magazine presenting a plurality of rows of distributed type, a carriage shiftable into alined position with said rows of type, a receptacle on said carriage for temporarily holding a composed line of type, mechanism associated with said carriage for moving said receptacle to withdraw the type from said rows and deposit them in said receptacle to form a composed line of type, and a type holder arranged to move with and relatively to said receptacle.

3. In a type setter, the combination with mechanism having a plurality of sets of distributed type, of a carriage having channel members forming a channel for temporarily holding the composed line of type and shiftable into operative position relatively to said sets of type, means associated with said carriage for moving said channel members to extract individual type from said sets and set them up in composition in said channel, and a type holder arranged to be moved with and relatively to said channel.

4. In a type setter, a magazine presenting a plurality of sets of distributed type, a type receiving member movable into operative relation with said sets of type and constructed to engage and extract individual type from said magazine, set them up in composition and temporarily hold them while being composed, and a type holder arranged to move with and relatively to said type receiving member.

5. In a machine for composing type for use in the type holders of addressing machines, the combination with a magazine having a plurality of slots containing distributed type, of a movable carriage upon which a type-holder is mounted, said carriage having a temporary receptacle in alinement with said type-holder and being shiftable into operative relation to the slots in said magazine, and mechanism associated with said carriage for moving said receptacle to withdraw type from said slots and deposit them in said receptacle to form a composed group of type previous to being transferred to said type-holder.

6. In a machine for setting up type used in the type holders of printing machines the combination with a magazine having a plurality of sets of distributed type, a shiftable carriage and a receptacle on said carriage and movable to extract individual type from said sets and set them up in a composed group and for temporarily retaining said composed group, and a printing-machine type-holder removably mounted upon said carriage in position to receive said composed group of type.

7. In a type-setting machine a magazine having a plurality of slots containing sets of distributed type, said slots terminating on a common line and presenting their type for removal therefrom, a carriage shiftable along said line in proximity to the terminal ends of said slots and having a receptacle for temporarily holding type, means associated with said carriage for moving said receptacle to remove individual type from said slots and deposit them in said receptacle to form a composed group of type, and a printing-machine type-holder detachably mounted on said carriage in position to receive a composed group of type from said receptacle.

8. In a type setting machine a magazine having a plurality of slots containing sets of distributed type, said slots terminating on a common line and presenting their type for removal therefrom, a carriage shiftable along said line in proximity to the terminal ends of said slots and having a receptacle for temporarily holding type, and means associated with said receptacle for advancing toward, moving transversely to said containing slots to remove individual type from the ends thereof, and for retreating with said removed type to deposit said type in said receptacle to form a composed group thereof.

9. In a type-setting machine a magazine having a plurality of slots containing sets of distributed type, said slots terminating on a common line and presenting their type for removal therefrom, a carriage shiftable along said line in proximity to the terminal ends of said slots, mechanism associated with and operable on said carriage for advancing toward said slots and moving transversely to the terminal ends of said slots to extract individual type therefrom, and a type holder removably mounted upon said carriage in position to receive the type from said mechanism.

10. In a machine for composing type, a magazine having a plurality of channels containing distributed type, said channels having their ends terminating upon a common line and presenting type along at said line for removal, a carriage shiftable parallel to said line, a composing device mounted on said carriage and mechanism associated therewith for advancing said composing device into engagement with individual type in said channels, and for retreating said composing device with the engaged type, said composing device being adapted to retain said individual type while they are being composed, and a type holder removably mounted on said carriage in position to receive the composed group of type from said composing device.

11. In a machine for composing type the combination with a plurality of sets of distributed type and a carriage and an extracting device mounted thereon having a movement relative to said sets of type for positioning said extracting device in operative relation to different sets, of means for advancing the extracting device toward said sets of type, moving the extracting device transversely to said sets of distributed type to remove the individual type therefrom and for retreating said extracting device with its captured type, and a type holder removably mounted on said carriage for receiving the captured type from said extracting device.

12. In a machine for composing type for use in the type holders of printing machines the combination with a magazine having a plurality of channels containing distributed type, said channels having ends formed to permit the type to be extracted from said channels, of an extracting device shiftable along the ends of said channels into a position in alinement therewith, said extracting device having an advance movement toward said channel for engaging the individual type, a transverse movement to said channel for removing the individual type, and a retreating movement from said channel.

13. In a machine for composing type for use in the type holders of printing machines the combination with a magazine having a plurality of channels containing distributed type, said channels having ends formed to permit the type to be extracted from said channels, of an extracting device shiftable along the ends of said channels into a position in alinement therewith, said extracting device having an advance movement toward said channels, a transverse movement to said channels for extracting the individual type therefrom, and a retreating movement from said channels, a movable support upon which said extracting device is mounted, and a printing machine type holder positioned on said support for receiving type from said composing device.

14. A machine for composing type for use in the type holders of printing machines having a substantially continuous type channel, a magazine having a slot forming one end portion of said channel, said slot containing a supply of distributed type, a composing device forming an intermediate portion of said channel, and mechanism for advancing said composing device to seize individual type from the magazine portion of said channel and for retreating said composing device to remove said type therefrom, said composing device being adapted to temporarily retain said captured type while a group thereof is being composed, and a type-holder movable relatively to said composing device forming the other end portion of said channel for receiving the composed group of type from said composing device.

15. A type-composing machine having a magazine containing type distributed into groups of similar type characters and having a composing device comprising a channeled member for temporarily retaining the captured type until a composed group thereof is set up, a portion of said composing device being arranged to seize and extract the individual type, a movable carriage for said composing device, and a portable type holder removably mounted on said carriage in position to receive the composed group of type from said composing device.

16. In a machine for composing type the combination with containers for a plurality of segregated groups of distributed type, and a movable receptacle having a portion thereof for engaging and extracting individual type from said groups and assembling them to form composed groups, and a type carrier mounted in position to receive the type from said extracting means and movable relatively to said extracting means.

17. In a type-composing machine a magazine having a plurality of sets of distributed type and having slots in which said sets of type are contained, a carriage movable relatively to said slots and a composing receptacle carried thereby and movable to collect individual type from the different sets and assemble them in a composed group, and a printing machine type-holder mounted upon said carriage for receiving type from said composing device.

18. In a type-composing machine a magazine having a plurality of sets of type in distributed condition, a carriage and a composing receptacle movable relatively to said sets of type and having type-engaging fingers extending therefrom for seizing and transferring the individual type therefrom to set up an assembled group in said composing receptacle, and a printing-machine type-holder mounted upon said carriage in position to receive an assembled group of type from said composing device.

19. A type-setting machine having a magazine containing a plurality of groups of distributed type, in combination with a carriage movable relatively to said groups, a composing receptacle on said carriage having type-engaging fingers extending therefrom for extracting individual type from said group, and a type-holder removably mounted on said carriage in position to receive type from said composing receptacle and arranged to be moved relatively thereto.

20. In a type-setting machine the combination with a magazine having a plurality of channels containing groups of distributed type, said channels terminating upon a common line and having outlets at their terminals to permit the removal of the individual type from said channels, a carriage and a composing stick mounted thereon and movable parallel with and in proximity to the terminals of said channels, and mechanism associated therewith for advancing said stick toward said channels to seize individual type therein and for retracting said stick to remove said type therefrom, and an addressing-machine type holder mounted on said carriage and having a type slot in alinement with said composing stick to receive the type therefrom.

21. In a type setting machine the combination with a magazine having a plurality of slots containing groups of distributed type, said slots terminating upon a common line and having their terminals unrestricted to permit the removal of the individual type from said slots, a carriage and a composing stick mounted thereon and movable parallel with and in proximity to the terminal ends of said slots, and mechanism for operating said composing stick to extract type from said slots, said composing stick having an advance movement parallel with the longitudinal axis of the slot for seizing type, a movement perpendicular thereto during which individual type are removed from said slot, and a return movement for returning to normal position.

22. In a type-setting machine the combination with a magazine having a plurality of slots containing groups of distributed type, said slots terminating upon a common line and having their terminals unrestricted to permit the removal of the individual type from said slots, a carriage and a composing stick mounted thereon and movable parallel with and in proximity to the terminal ends of said slots, said composing stick having a rectangular path of movement and being adapted to seize and remove individual type from said slots during its movement along two sides of said rectangle, and to agitate the removed type for assembling them during its movement along the other two sides of said rectangle.

23. In a type-setting machine the combination of a magazine having a slot therein containing type, a composing stick and an addressing-machine type holder providing together a substantially continuous channel, said holder being arranged to be moved relatively to said composing stick, said magazine portion of said channel containing a supply of individual distributed type, said composing stick comprising an intermediate portion of said channel and having a series of movements during which it engages and withdraws type from said magazine portion for delivery to said type-holder portion of said channel.

24. A type-setter comprising a magazine having a plurality of parallel channels containing groups of distributed type, a composing receptacle and a carriage therefor shiftable into operative position with respect to the ends of said channels, and mechanism for imparting to said composing receptacle a longitudinal movement approaching the ends of said channels for seizing individual type, and for imparting thereto a perpendicular movement for extracting said individual type, and a type holder removably mounted on said carriage for receiving the type from said composing receptacle.

25. A type-setter comprising a magazine having a plurality of parallel channels containing groups of distributed type, a composing device and a carriage therefor shiftable into operative position with respect to the ends of said channels, and mechanism for imparting to said composing device a longitudinal movement approaching the ends of said channels for seizing individual type, and for imparting thereto a perpendicular movement for extracting said individual type, and a type holder having a plurality of type slots, said type holder being mounted upon said carriage and relatively movable thereon for bringing its several slots into position to receive type from said composing device.

26. A type-setter comprising a magazine having a plurality of parallel channels containing groups of distributed type, a composing device and a carriage therefor shiftable into operative position with respect to the ends of said channels, and mechanism for imparting to said composing device a longitudinal movement approaching the ends of said channels for seizing individual type, and for imparting thereto a perpendicular movement for extracting said individual type, an auxiliary carriage mounted upon said first mentioned carriage, and a type holder removably carried by said auxiliary carriage and having a plurality of type slots, said auxiliary carriage being relatively movable on said carriage for adjusting the various slots of said type holder in position to receive type from said composing device.

27. In a type setting machine, a magazine having a plurality of channels, each containing a supply of individual type, said channels terminating in a common line, a carriage shiftable parallel to said line, a type receiver having projecting type engaging fingers carried thereby and operable to remove individual type from said channels and assemble them in a composed group, a locking plate having a plurality of holes representing the coöperative positions of said type remover with relation to said channels, a plunger arranged to be projected into said holes, and mechanism for operating said combined receiver and extractor and for projecting said plunger into one of said holes to lock the combined receiver and extractor in its operative position slightly in advance of the operation thereof.

28. In a type-setting machine a magazine having a plurality of channels each comprising a supply of individual type, said channels terminating on a common line, a carriage shiftable parallel to said line, a type-remover carried thereby and operable to remove individual type from said channels, and assemble them in a composed group, a locking plate having a plurality of holes representing the coöperative positions of said type-remover with relation to said channels, a cam operated plunger coöperating with said plate, and mechanism for operating said type-remover and for simultaneously rocking the cams of said locking plunger to cause it to lock said type-remover in position slightly in advance of the operation of said type remover.

29. In a type-setter the combination with a magazine having a plurality of ribs forming type channels, said channels containing a plurality of grooved type held therein by said ribs, the front walls of said channels terminating on a common line and having abutments at their terminal ends for holding the type therein against longitudinal movement, said channels having outlets at the terminal ends for permitting the removal of type from said channels, and a type extractor movable into operative relation to the terminal ends of said channels, said type extractor comprising two parallel plates spaced apart to form a channel and having their ends formed to engage the grooves in said type, and mechanism for moving said type extractor into engagement with the end type in said channels and moving the extractor transversely to said channels to remove the type therefrom, said extracted type being adapted to be temporarily retained in the channel of said type extractor.

30. In a type-setter the combination with a magazine having a plurality of ribs forming type channels, said channels containing a plurality of grooved type held therein by said ribs, said channels terminating on a common line and having abutments at their terminal ends for holding the type therein against longitudinal movement, outlets at the terminal ends of said channels for permitting the removal of type from said channels, and a type extractor movable into operative relation to said outlets, said type extractor comprising two parallel plates spaced apart to form a channel and having their ends formed to engage the grooves in said type, and mechanism for moving said type extractor into engagement with the end type in said channels to remove it therefrom, said extracted type being adapted to be temporarily retained in the channel of said type-extractor, and a printing machine type holder movable with said type extractor and mounted in position to receive the type therefrom.

31. In a type-setting machine the combination with a magazine having channels containing rows of distributed type, said type being automatically fed downwardly by gravity, a type-extractor and a carriage therefor movable along the ends of said channels into a position in alinement with one of said channels, said type extractor being arranged to seize the lowermost type in said rows and be moved transversely to the channels to remove it therefrom, and being arranged to retain said removed type to form a composed group.

32. In a type-setting machine the combination with a magazine having channels containing rows of distributed type, said type being automatically fed downwardly by gravity, a type extractor and a carriage therefor movable along the ends of said channels into a position in alinement with one of said channels, said type extractor being arranged to seize the lowermost type in said rows and remove it therefrom, and being arranged to retain said removed type to form a composed group, and a type holder mounted on said carriage in position to receive a composed group of type from said extractor.

33. In a type-setting machine the combination with a magazine having channels containing rows of distributed type, said type being automatically fed downwardly by gravity, a type extractor and a carriage therefor movable along the ends of said channels into a position in alinement with one of said channels, said type extractor being arranged to seize the lowermost type in said rows and remove it therefrom, and being arranged to retain said removed type to form a composed group, and a type-holder having a plurality of type slots and being movably mounted on said carriage for positioning one of its ends to receive a composed group of type from said type extractor.

34. In a type-setting machine the combination with a main frame, and a plurality of magazines disposed one on top of the other therein, said magazines having a plurality of slots containing rows of distributed type adapted to feed downwardly in said slots by gravity, type stops at the lower ends of said slots for maintaining said rows of type therein, a carriage movable along the ends of said slots and composing stick carried thereby for extracting the lowermost type in said rows and assembling them in a composed group, and a support for said carriage movable in said framework for shifting said carriage and the composing device carried thereby at right angles to its former movement and into operative relation to the different magazines.

35. A type-composing device having a plurality of magazines containing a supply of "upper" and "lower" case type, the type in each magazine being disposed in parallel rows; and terminating along a common line, a traveling carriage arranged to travel parallel with the common line of each magazine; a composing device mounted upon and movable with said carriage into relatively operative position with respect to the rows of type for extracting type from said rows and collecting them together in an assembled group, a type-holder removably mounted upon said carriage, and means for shifting said carriage, composing device and type holder simultaneously into operative relation with either of said magazines.

36. In a type-setting machine the combination with a plurality of containers having a supply of type arranged therein in a distributed condition, an extractor movable relatively to said containers for extracting individual type from said supply and grouping them in composition, a type holder for receiving said extracted type from said mechanism, and means associated with said type holder for rectifying "errors" made in the composited type in said type holder.

37. In a type-setting machine the combination with a plurality of containers having a supply of type arranged therein in a sorted condition, and an extractor movable relatively to said containers for collecting type from said supply to form a composited group thereof, a printing-machine type holder associated with said mechanism for receiving and retaining said type in a composited group, and means associated with said type holder for correcting "errors" in said composited group.

38. In a type-setting machine, the combination with a plurality of containers having a supply of type arranged therein in a sorted condition, and an extractor movable relatively to said containers for collecting type from said supply to form a composited group thereof, a printing-machine type holder associated with said mechanism for receiving and retaining said type in a composited group, and an "error" rectifying receptacle associated with said type holder for receiving type therefrom and temporarily holding said type while an error in the composited group in said type holder is being rectified.

39. In a type-setting machine the combination with a plurality of containers having a supply of type arranged therein in a sorted condition, and an extractor movable relatively to said containers for collecting type from said supply to form a composited line of type, a printing-machine type holder for receiving the type from said mechanism and for retaining them in a composited line, and an "error" rectifying channel for receiving a portion of the line of type from said type holder and for temporarily retaining said portion in its composited condition while an error is being rectified in the remaining portion of said line left in the type holder.

40. In a type-setting machine a magazine containing a supply of distributed type disposed therein in condition to be removed therefrom, a composing device and a carriage therefor shiftable relatively to said magazine for extracting individual type therefrom at different points, a printing-machine type holder for receiving type from said composing device and for retaining said type in a composed line, an "error" channel carried by said composing device carriage, and means for shifting said type holder into position in operative relation either to said composing device or to said "error" channel, said "error" channel being adapted to receive from said type holder and to temporarily retain a portion of the composited line of type beyond an error in said line so that said type holder may be positioned relatively to said composing device to correct the error in the remaining portion of said composited line.

41. In a type-setting machine, a frame and a magazine supported therein containing a plurality of rows of type in distributed condition and presenting the end type in each row for removal therefrom, a carriage and a composing device shiftable in said frame for extracting the end type from said rows and setting them up in composition, a mounting for said composing device, and pressure devices normally maintaining said composing device and mounting in proper position on said carriage but permitting the convenient removal thereof should the type become fouled therein.

42. In a type setting machine, a frame and a magazine supported therein containing a plurality of rows of type in distributed condition and presenting the end type in each row for removal therefrom, a carriage and a composing device shiftable in said frame for extracting the end type from said rows and setting them up in composition, a mounting for said composing device, pressure devices normally maintaining said composing device and mounting in proper position on said carriage but permitting the convenient removal thereof should the type become fouled therein, and a printing machine type holder mounted on said carriage below said composing device and in position to receive type therefrom.

43. In a type-setting machine a plurality of magazines containing rows of distributed type and presenting the end type in said rows for removal therefrom, a carriage movable parallel to and along the ends of said rows, a composing device mounted upon and movable with said carriage, and means associated therewith for moving said carriage to bring said composing device into alinement with the rows of type in said magazine and for imparting to said composing device a series of movements for extracting the end type in the row with which it is alined, and a shifting lever for swinging said carriage and composing device into operative relation to any of said magazines.

44. In a type-setting machine a plurality of magazines containing rows of distributed type and presenting the end type in said rows for removal therefrom, a carriage movable parallel to and along the ends of said rows, a composing device mounted upon and movable with said carriage, and means associated therewith for moving said carriage to bring said composing device into alinement with the rows of type in said magazine and for imparting to said composing device a series of movements for extracting the end type in the row with which it is alined, a swingable framework upon which said carriage is movably mounted for bodily shifting the carriage and composing device into operative relation to any one of said magazines and a shifting lever for swinging said frame.

45. In a type-setting machine a plurality of magazines containing rows of distributed type and presenting the end type in said rows for removal therefrom, a carriage movable parallel to and along the ends of said rows, a composing device mounted upon and movable with said carriage, and means associated therewith for moving said carriage to bring said composing device into alinement with the rows of type in said magazine and for imparting to said composing device a series of movements for extracting the end type in the row with which it is alined, a shiftable framework upon which said carriage is movably mounted for bodily shifting the carriage and composing device into operative relation to any one of said magazines and a swinging lever for swinging said frame, an auxiliary carriage mounted upon said composing device carriage, and a type holder carried thereby having a plurality of type-retaining slots, said auxiliary carriage being relatively movable on said other carriage to bring the type holder slots into position to receive type from said composing device.

46. In a type-setting machine the combination with a magazine having a plurality of channels containing rows of sorted type, said magazine being disposed in an inclined plane and adapted to feed the rows of type downwardly by gravity, a carriage movable along the lower ends of said channels, a composing device mounted upon said carriage and movable therewith, and means for moving said carriage to position said composing device in alinement with the channels of said magazines and for causing said composing device to move forward in substantially the plane of the magazine to seize the end type in the row with which it is alined, and to move out of said plane and carry with it the seized type, and a printing-machine type holder positioned on said carriage for receiving the type from said composing device.

47. In a device of the character described, the combination with a plurality of magazines, each having a plurality of channels and arranged one in front of another, a carriage shiftable in two directions at right angles to each other to permit it to be moved into alinement with any one of said channels, and a type extractor for engaging and removing individual type from said channels mounted on said carriage.

48. In a type-setting device, the combination with a plurality of magazines arranged one in front of another, each magazine having a plurality of slots arranged in parallel rows and having their ends terminating along the common line, and an individual type extractor having its line of travel parallel with the common line and arranged to be shifted at right angles to the common line to a position beneath any one of the magazines.

49. In a type composing device, the combination with a plurality of magazines arranged one in front of another, each magazine having a plurality of type containers arranged in parallel rows and terminating along the common line, a traveling carriage having its line of travel parallel with said common line and shiftable transversely to the common line to a position beneath any one of said magazines, and a composing device mounted upon and movable with said carriage.

50. The combination, with a type case, of a type stick guided to shift with reference to the channels of the case and capable of a movement transverse to its shifting to present the stick to the case, a finger lever traveling with the stick for effecting such transverse movement, and a roller traveling with the stick for facilitating said shifting.

51. The combination of a channeled type case, provided by overhanging rails held parallel with each other in an upwardly extending plane, a guide parallel with the bottom edge thereof, a carriage slidable laterally on said guide, a type stick mounted on the carriage and having an up-and-down slot adapted to hold a row of type, and finger mechanism on the carriage for shifting it and for moving the stick into registration with a type channel.

52. The combination of a flat type case having a series of channels side by side and open at their lower ends, transverse guides parallel with such lower ends, a carriage slidable along one of such guides and carrying a roller to facilitate sliding, a type stick mounted on the carriage, a finger mechanism on the carriage serving the double purpose of shifting it laterally and of moving the stick transversely to bring it into registration with the row of type in a channel of the type case.

53. The combination of a flat type case having a series of channels side by side, transverse guides parallel with the lower ends of such channels, a carriage slidable along such guides and carrying a roller to facilitate the sliding, a type stick mounted on the carriage, and finger mechanism on the carriage, serving the double purpose of shifting it and of moving the stick in a direction transverse to the shifting to cause it to coact with the bottom type in the channel to which it is opposite.

In testimony whereof, I have hereunto set my hand, this 11th day of June, 1910, in the presence of two subscribing witnesses.

DAVYDD C. HUGHES.

Witnesses:
M. SIMON,
EDGAR F. BEAUBIER.